(12) United States Patent
Yoshikawa

(10) Patent No.: US 9,107,165 B2
(45) Date of Patent: Aug. 11, 2015

(54) CIRCUIT ARRANGEMENT, COMMUNICATION DEVICE, AND COMMUNICATION SYSTEM

(75) Inventor: Yasushi Yoshikawa, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 297 days.

(21) Appl. No.: 13/421,189

(22) Filed: Mar. 15, 2012

(65) Prior Publication Data
US 2012/0244799 A1    Sep. 27, 2012

(30) Foreign Application Priority Data

Mar. 22, 2011  (JP) ................................. 2011-062134

(51) Int. Cl.
    *H04B 7/24*    (2006.01)
    *H04W 52/02*   (2009.01)
(52) U.S. Cl.
    CPC ................................. *H04W 52/0254* (2013.01)
(58) Field of Classification Search
    CPC ....... H04W 16/14; H04W 4/12; H04W 84/18; G06K 19/0723
    USPC ................... 455/39, 41.1, 41.2, 413
    See application file for complete search history.

(56) References Cited

U.S. PATENT DOCUMENTS

| | | | | |
|---|---|---|---|---|
| 5,569,910 | A * | 10/1996 | Griesemer | 250/221 |
| 6,760,942 | B2 * | 7/2004 | Lee et al. | 8/159 |
| 7,522,639 | B1 * | 4/2009 | Katz | 370/503 |
| 7,705,743 | B2 * | 4/2010 | Barone et al. | 340/682 |
| 8,026,897 | B2 * | 9/2011 | Machida | 345/159 |
| 2002/0040259 | A1 * | 4/2002 | Lee et al. | 700/170 |
| 2009/0190170 | A1 * | 7/2009 | Yoshie | 358/1.15 |
| 2009/0195350 | A1 * | 8/2009 | Tsern et al. | 340/3.1 |
| 2010/0087981 | A1 * | 4/2010 | Orozco-Perez | 701/30 |

FOREIGN PATENT DOCUMENTS

| | | |
|---|---|---|
| JP | A-7-221743 | 8/1995 |
| JP | B2-2785760 | 5/1998 |
| JP | B2-2897684 | 3/1999 |
| JP | 2000-132661 A | 5/2000 |
| JP | A-2002-141894 | 5/2002 |
| JP | B2-3381353 | 12/2002 |
| JP | 2004-289584 A | 10/2004 |
| JP | 2008-154004 A | 7/2008 |
| JP | 2009-188764 A | 8/2009 |

* cited by examiner

*Primary Examiner* — Hai V Nguyen
(74) *Attorney, Agent, or Firm* — Oliff PLC

(57) ABSTRACT

A circuit arrangement performs communication with an external device including a second sensor detecting a given event, includes a sensor input unit that processes input from a first sensor detecting the given event and a communication control unit that controls operation of a wireless communication unit, and determines a communication time based on an output of the first sensor and performs communication with the external device via the wireless communication unit according to the communication time.

10 Claims, 7 Drawing Sheets

CIRCUIT ARRANGEMENT, COMMUNICATION DEVICE, AND COMMUNICATION SYSTEM

The present application claims a priority based on Japanese Patent Application No. 2011-062134 filed on Mar. 22, 2011, the contents of which are incorporated herein by reference.

BACKGROUND

1. Technical Field

The present invention relates to a circuit arrangement, a communication device, and a communication system.

2. Related Art

In a communication device in related art, synchronization of wireless communication has been performed using timer control with reference clock of a quartz oscillator as a basic technology (for example, see Patent Document 1 (JP-A-7-221743)).

However, in the communication device in related art, because the synchronization shift width depends on the precision of the quartz oscillator, it is necessary to constantly perform communication for synchronization correction at predetermined communication intervals and necessary to constantly and continuously oscillate the quartz oscillator, and there has been a problem that power consumption is greater both at the host side and the terminal side.

SUMMARY

An advantage of some aspects of the invention is to provide a circuit arrangement, a communication device, and a communication system that can perform wireless communication with low power consumption.

(1) An aspect of the invention is directed to a circuit arrangement that performs communication with an external device including a second sensor detecting a given event, includes a sensor input unit that processes input from a first sensor detecting the given event, and a communication control unit that controls operation of a wireless communication unit, and determines a communication time based on an output of the first sensor and performs communication with the external device via the wireless communication unit according to the communication time.

According to the aspect of the invention, communication with the external device may be performed according to the time when the first sensor and the second sensor of the external device detect the same event, and wireless communication may be performed with low power consumption without constant operation of quartz oscillators for the purpose of synchronization or performance of synchronization correction communication at predetermined intervals.

(2) The circuit arrangement may start the communication with the external device via the wireless communication unit based on the output of the first sensor, and perform communication with the external device via the wireless communication unit based on an output of a timer after a predetermined time has elapsed from the start of the communication.

According to this configuration, by starting the communication based on the output of the first sensor, power consumption at the start of communication when the power consumption is larger may be reduced.

(3) The circuit arrangement may perform the communication with the external device via the wireless communication unit when determining that the output of the first sensor satisfies a predetermined condition at a predetermined number of times.

According to this configuration, the communication intervals of communication may be made longer and wireless communication may be performed with lower power consumption.

(4) The circuit arrangement may perform the communication with the external device via the wireless communication unit after a predetermined time has elapsed from determination that the output of the first sensor satisfies a predetermined condition.

According to this configuration, when there are plural circuit arrangements that perform communication with the external device, occurrence of collision may be prevented.

(5) In the circuit arrangement, the first sensor may be a sensor that detects at least one of movement, light, sound, and pressure.

(6) Another aspect of the invention is directed to a communication device including the circuit arrangement, the first sensor, and the wireless communication unit.

(7) In the communication device, the first sensor may be an inertia sensor that detects movement, and the circuit arrangement may perform processing of measuring the number of steps based on the output of the first sensor and perform processing of transmitting a measurement result to the external device via the wireless communication unit at a communication time determined based on the output of the first sensor.

According to the aspect of the invention, by determining the communication time based on the output of the inertia sensor while measuring the number of steps based on the output of the inertia sensor, the measurement result can be transmitted to the external device at a time when the number of steps is measured, and wireless communication with high efficiency and low power consumption may be performed.

(8) Still another aspect of the invention is directed to a communication system including a first communication device and a second communication device that perform wireless communication with each other, and the first communication device includes a first wireless communication unit that performs wireless communication between the second communication device and itself, a first sensor that detects a given event, and a first circuit arrangement that determines a first communication time based on an output of the first sensor, and performs communication with the second communication device via the first wireless communication unit according to the first communication time, and the second communication device includes a second wireless communication unit that performs wireless communication between the first communication device and itself, a second sensor that detects the given event, and a second circuit arrangement that determines a second communication time based on an output of the second sensor and performs communication with the first communication device via the second wireless communication unit according to the second communication time.

According to the aspect of the invention, communication may be performed between the first and second communication devices according to the time when the first sensor and the second sensor detect the same event, and wireless communication may be performed with low power consumption without constant operation of quartz oscillators for the purpose of synchronization or performance of synchronization correction communication at predetermined intervals.

(9) In the communication system, the first sensor and the second sensor may be inertia sensors that detect movement, and the first communication device and the second communication device may be mounted on a human body or a vehicle body.

According to the aspect of the invention, by mounting the first and second communication devices on a human body or a vehicle body, the first and second communication devices may perform communication between the first and second communication devices according to the time when the first and second communication devices detect movement of the human body or the vehicle body.

(10) In the communication system, the first sensor and the second sensor may be inertia sensors that detect movement, the first circuit arrangement may perform processing of measuring the number of steps based on the output of the first sensor and perform processing of transmitting a measurement result to the second communication device via the first wireless communication unit at a communication time determined based on the output of the first sensor, and the second circuit arrangement may perform processing of receiving the measurement result via the second wireless communication unit at a communication time determined based on the output of the second sensor.

According to the aspect of the invention, by determining the communication time based on the output of the inertia sensor while measuring the number of steps based on the output of the inertia sensor, the measurement result can be transmitted from the first communication device to the second communication device at the time when the number of steps is measured, and wireless communication with high efficiency and low power consumption may be performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, an embodiment of the invention will be explained with reference to the drawings.

1. Configuration

Figure 1:
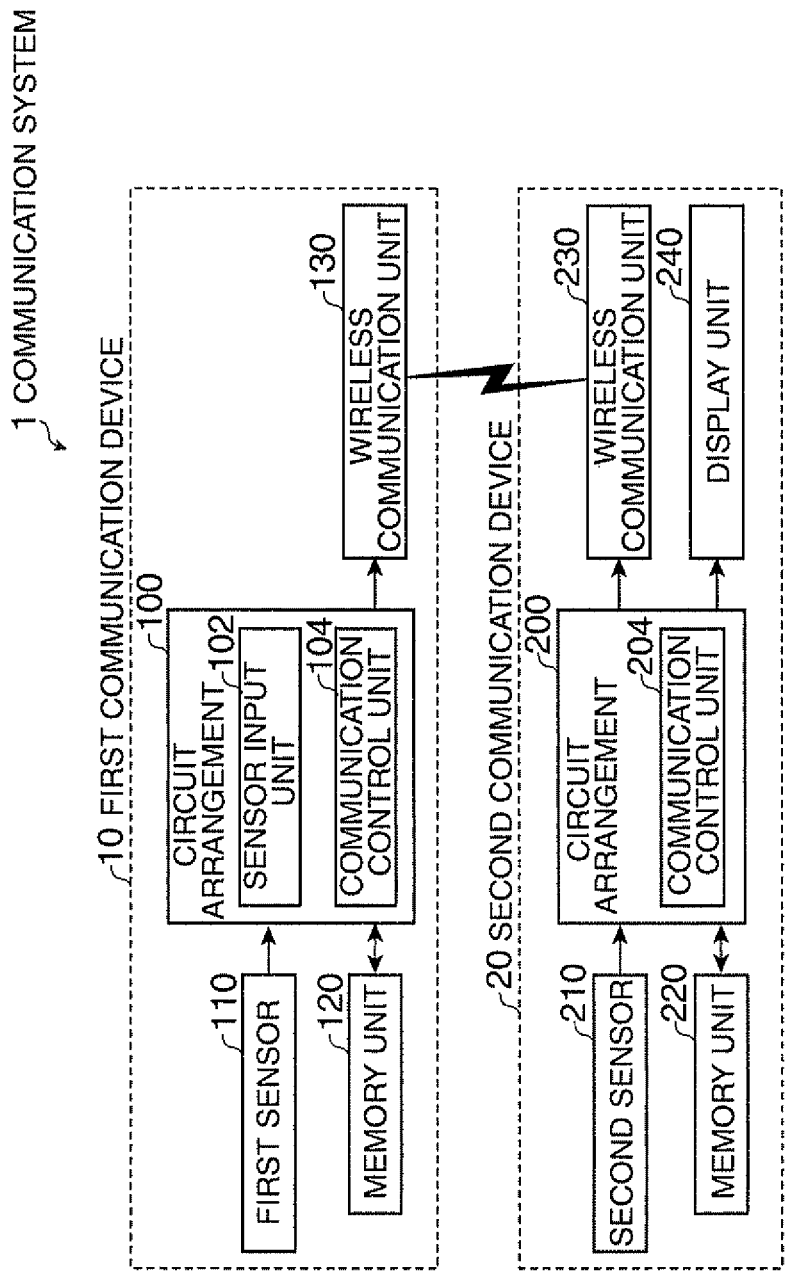
FIG. 1 is a functional block diagram of a communication system including a circuit arrangement and a communication device according to an embodiment.

FIG. 1 shows an example of a functional block diagram of a communication system including a circuit arrangement and a communication device according to the embodiment. Note that the communication system of the embodiment may have a configuration in which part of component elements in FIG. 1 is omitted.

A communication system 1 shown in FIG. 1 includes a first communication device 10 (corresponding to a communication device and a first communication device according to the invention) and a second communication device (corresponding to an external device and a second communication device according to the invention) performing wireless communication with each other.

The first communication device 10 is an electronic device that can perform wireless communication and the second communication device 20 is, for example, a portable information processing device that can perform wireless communication such as a cellular phone, a wrist watch, or the like.

1-1. First Communication Device

The first communication device 10 includes a circuit arrangement 100, a first sensor 110, a memory unit 120, and a wireless communication unit 130.

The first sensor 110 detects movement (inertia force) of a user carrying (wearing) the first communication device 10, and, for example, may be an acceleration sensor that detects acceleration or a gyro sensor (angular velocity sensor) that detects an angular velocity. The first sensor 110 is provided under the condition that its relative position is fixed with respect to the first communication device 10, and may detect the movement of the first communication device 10. The output of the first sensor 110 is input to an A/D converter (not shown) and the output of the A/D converter is input to the circuit arrangement 100.

The memory unit 120 serves as a work region of the circuit arrangement 100, and further, stores programs, data, etc. for functioning a computer as the respective units (a sensor input unit 102, a communication control unit 104) of the circuit arrangement 100. The functions may be realized using a RAM, ROM, or the like.

The wireless communication unit 130 (first wireless communication unit) performs various controls for performing wireless communication between the second communication device 20 and itself, and the functions may be realized using various processors, communication ASIC, etc. The wireless communication unit 130 realizes near-field wireless communication in the mode of Bluetooth, wireless LAN, ANT, or the like, for example.

The circuit arrangement 100 (first circuit arrangement) uses the memory unit 120 as the work region for control of performing data processing and determining a communication time based on the output of the first sensor 110 and transmitting a processing result to the second communication device 20 via the wireless communication unit 130 according to the determined communication time. The functions may be realized by a processor such as a CPU and programs. The circuit arrangement 100 includes the sensor input unit 102 and the communication control unit 104.

The sensor input unit 102 processes the input from the first sensor 110 that detects a given event (for example, movement of the user). The sensor input unit 102 performs processing of measuring the number of steps based on the output of the first sensor 110. For example, the sensor input unit 102 detects the number of steps if determining that the output value of the first sensor 110 has exceeded a predetermined threshold value, and performs counting of the number of steps. The count value (measurement value) of the number of steps is temporarily stored in the memory unit 120.

The communication control unit 104 determines the communication time based on the output of the first sensor 110, and performs communication with the second communication device 20 via the wireless communication unit 130 according to the determined communication time. The communication control unit 104 transmits the measurement value of the number of steps (the count value of the number of steps) detected by the sensor input unit 102 to the second communication device 20 via the wireless communication unit 130 at the determined communication time.

For example, if determining that the output value of the first sensor 110 has exceeded a predetermined threshold value (if determining that the output value of the first sensor 110 satisfies a predetermined condition), the communication control unit 104 generates an interrupt signal to bring the wireless communication unit 130 into a communicable status (active mode) and transmits the measurement value of the number of steps to the second communication device 20 via the wireless communication unit 130 in the communicable status. Then, the communication control unit 104 brings the wireless communication unit 130 into an incommunicable status (sleep mode) after transmission of the measurement value.

Here, the threshold value for detection of the communication time and the threshold value for detection of the number of steps may be set to the same value or different values. Further, the first communication device 10 may include plural sensors and communicate a detection result of another sensor than the sensor determining the communication time. For example, the first communication device 10 may separately include the sensor for determination of the communication time and the sensor for detection of the number of steps.

Further, the communication control unit 104 may start communication with the second communication device 20 via the wireless communication unit 130 based on the output of the first sensor 110, and perform communication with the second communication device 20 via the wireless communication unit 130 based on the output of a timer of the first communication device 10 after a predetermined time has elapsed from the start of communication.

Furthermore, the communication control unit 104 may determine the communication time based on the output of the first sensor 110 and output of a second sensor 210 received from the second communication device 20. For example, the communication control unit 104 determines whether or not the output value of the first sensor 110 and the output value of the second sensor 210 are based on the same event (movement of the user) and, if determining that the values are based on the same event, performs communication with the second communication device 20. Whether or not the values are based on the same event may be determined by taking a correlation between the output values, or may be determined by the times when the output value of the first sensor 110 and the output value of the second sensor 210 are respectively output. In this manner, the communication time may be determined more reliably.

Further, the communication control unit 104 may perform communication with the second communication device 20 via the wireless communication unit 130 if determining that the output of the first sensor 110 satisfies a predetermined condition at a predetermined number of times (if determining that the output value of the first sensor 110 exceeds a predetermined threshold value at the predetermined number of times).

Furthermore, the communication control unit 104 may perform communication with the second communication device 20 via the wireless communication unit 130 after a predetermined time has elapsed from determination that the output of the first sensor 110 satisfies a predetermined condition (determination that the output value of the first sensor 110 exceeds a predetermined threshold value).

1-2. Second Communication Device

The second communication device 20 includes a circuit arrangement 200, the second sensor 210, a memory unit 220, a wireless communication unit 230, and a display unit 240.

The second sensor 210 detects movement (inertia force) of a user carrying (wearing) the second communication device 20, and, for example, may be an acceleration sensor that detects acceleration or a gyro sensor (angular velocity sensor) that detects an angular velocity. The second sensor 210 is provided under the condition that its relative position is fixed with respect to the second communication device 20, and may detect the movement of the second communication device 20. The output of the second sensor 210 is input to an A/D converter (not shown) and the output of the A/D converter is input to the circuit arrangement 200. Note that, since the number of steps is not detected in the second communication device 20, a sensor with lower accuracy and a lower price (for example, an uniaxial acceleration sensor) than those of the sensor of the first communication device 10 (for example, a triaxial acceleration sensor) may be employed.

The memory unit 220 serves as a work region of the circuit arrangement 200, and further, stores programs, data, etc. for functioning the second communication device 20 (computer) as the respective units of the circuit arrangement 200. The functions may be realized using a RAM, ROM, or the like.

The wireless communication unit 230 (second wireless communication unit) performs various controls for performing wireless communication between the first communication device 10 and itself, and its functions may be realized using various processors, communication ASIC, etc. The wireless communication unit 230 realizes near-field wireless communication in the mode of Bluetooth, wireless LAN, ANT, or the like, for example.

The display unit 240 outputs images generated in the circuit arrangement 200, and its function may be realized using an LCD, a touch-panel display, or the like.

The circuit arrangement 200 (second circuit arrangement) uses the memory unit 220 as the work region to perform processing of determining a communication time based on the output of the second sensor 210, perform communication with the first communication device 10 via the wireless communication unit 230 according to the determined communication time, and allow the display unit 240 to display the measurement value of the number of steps received from the first communication device 10. The functions may be realized by a processor such as a CPU and programs. The circuit arrangement 200 includes a communication control unit 204.

The communication control unit 204 determines the communication time based on the output of the second sensor 210, and performs communication with the first communication device 10 via the wireless communication unit 230 according to the determined communication time. That is, the communication control unit 204 receives the measurement value of the number of steps transmitted from the first communication device 10 via the wireless communication unit 230 at the determined communication time.

For example, if determining that the output value of the second sensor 210 has exceeded a predetermined threshold value (if determining that the output value of the second sensor 210 satisfies a predetermined condition), the communication control unit 204 generates an interrupt signal to bring the wireless communication unit 230 into a communicable status (active mode) and receives the measurement value of the number of steps from the first communication device 10 via the wireless communication unit 230 in the communicable status. Then, the communication control unit 204 brings the wireless communication unit 230 into an incommunicable status (sleep mode) after reception of the measurement value.

Further, the communication control unit 204 may start communication with the first communication device 10 via the wireless communication unit 230 based on the output of the second sensor 210, and perform communication with the first communication device 10 via the wireless communication unit 230 based on the output of the timer of the second communication device 20 after a predetermined time has elapsed from the start of communication.

Furthermore, the communication control unit 204 may determine the communication time based on the output of the second sensor 210 and the output of the first sensor 110 received from the first communication device 10. For example, the communication control unit 204 determines whether or not the output value of the second sensor 210 and the output value of the first sensor 110 are based on the same event (movement of the user) and, if determining that the values are based on the same event, performs communication with the first communication device 10.

Further, the communication control unit 204 may perform communication with the first communication device 10 via the wireless communication unit 230 if determining that the output of the second sensor 210 satisfies a predetermined condition at a predetermined number of times (if determining that the output value of the second sensor 210 exceeds a predetermined threshold value at the predetermined number of times).

Furthermore, the communication control unit 204 may perform communication with the first communication device 10 via the wireless communication unit 230 after a predetermined time has elapsed from determination that the output of the second sensor 210 satisfies a predetermined condition.

2. Technique of Embodiment

Next, a technique of the embodiment will be explained using the drawings.

Figure 2:
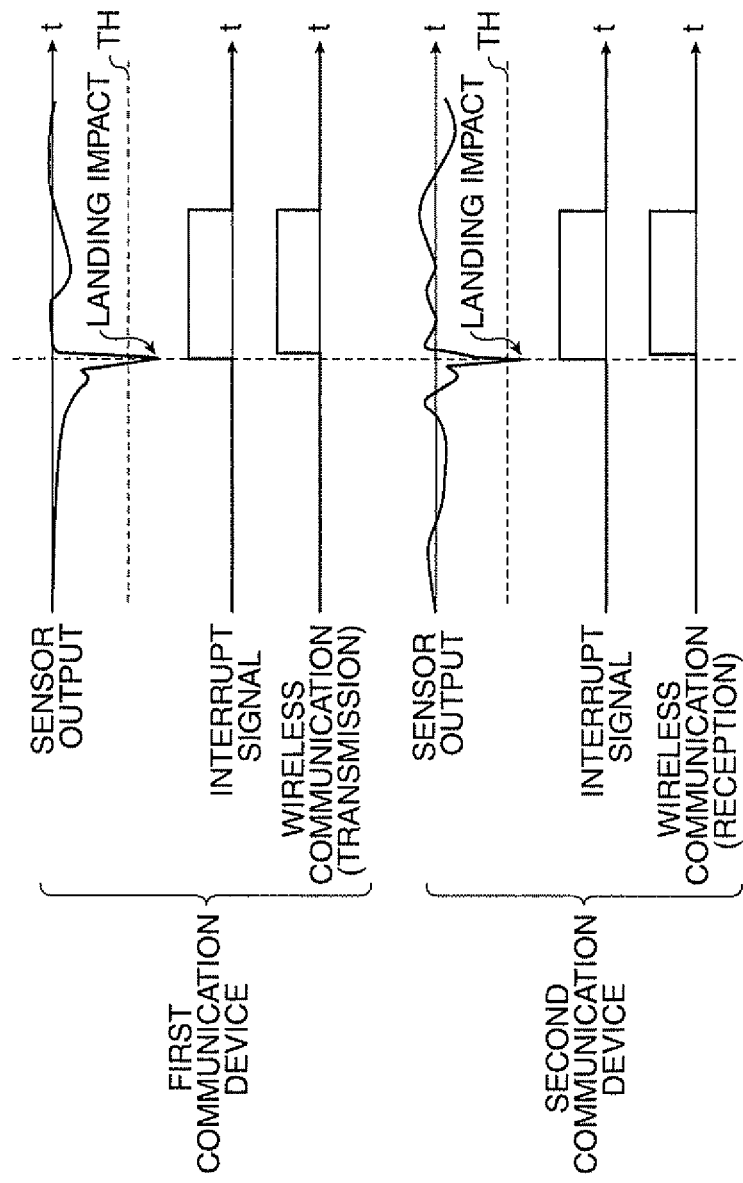
FIG. 2 is a diagram for explanation of a technique of the embodiment.

FIG. 2 shows examples of transition of output values of the sensors in the first and second communication devices 10, 20 and generation times of interrupt signals at that moment and times of wireless communication.

As shown in FIG. 2, when the user carries (wears) the first communication device 10 and the second communication device 20 and walks, in the first communication device 10, the output value of the first sensor 110 exceeds a predetermined threshold value TH by the impact of the landing in walking, thereby, the number of steps is counted and an interrupt signal is generated, and the wireless communication unit 130 is brought into the communicable status and the measurement value of the number of steps is transmitted to the second communication device 20.

Similarly, in the second communication device 20, the output value of the second sensor 210 exceeds a predetermined threshold value TH by the impact of the landing in walking, thereby, an interrupt signal is generated nearly at the same time with that of the first communication device 10, and the wireless communication unit 230 is brought into the communicable status and may receive the measurement value of the number of steps transmitted from the first communication device 10.

In this manner, in the communication system 1 of the embodiment, communication is performed according to the time when the first sensor 110 of the first communication device and the second sensor 210 of the second communication device detect the movement (landing impact) of the user.

Note that, in the first and second communication devices 10, 20, communication may be performed by generating interrupt signals after a predetermined time has elapsed after the output values of the first and second sensors 110, 210 exceed the threshold values TH.

Figure 3:
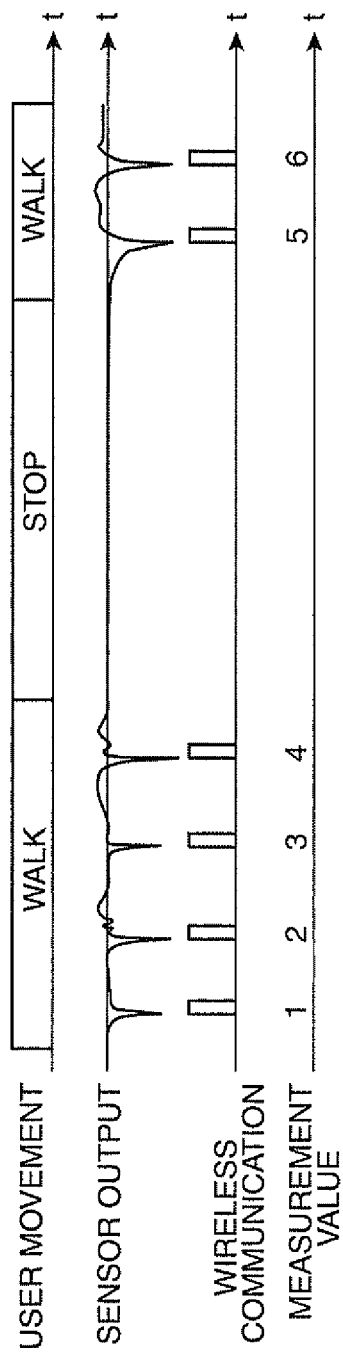
FIG. 3 is a diagram for explanation of the technique of the embodiment.

FIG. 3 shows examples of transition of movement of a user, output values of the sensor at that moment, times of wireless communication, and measurement values to be transmitted.

As shown in FIG. 3, in the communication system of the embodiment, when the user walks, communication is performed at the times when landing impacts (the number of steps) are detected and the measurement values of the numbers of steps are transmitted from the first communication device 10 to the second communication device 20. Or, when the user stops, wireless communication is not performed because the number of steps is not detected.

That is, in the communication system of the embodiment, only the wireless communication necessary for measurement and transmission of the number of steps is performed, and thus, power consumption at the transmission side (first communication device 10) and the reception side (second communication device 20) may efficiently be reduced. Further, in the communication system of the embodiment, the communication times are determined based on the output values of the sensors, and thus, it is not necessary to constantly operate the quartz oscillators for the purpose of synchronization or perform synchronization correction communication at predetermined intervals and communication may be performed with low power consumption.

Figure 4:
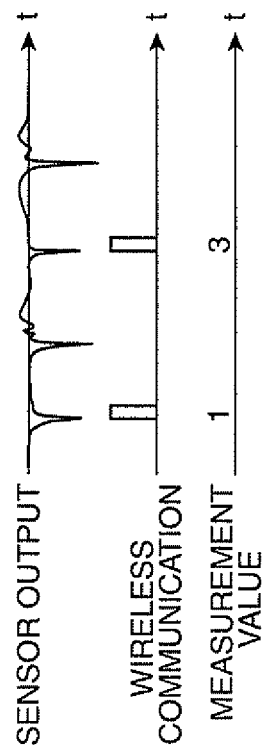
FIG. 4 is a diagram for explanation of the technique of the embodiment.

Note that, in the communication system of the embodiment, communication may be performed at times when plural times of landing impacts (numbers of steps) are detected based on the outputs of the sensors. In the example shown in FIG. 4, after the first landing impact is detected, one communication is performed when the landing impacts are detected twice. Therefore, the measurement value of the number of steps to be transmitted increases two by two. In this manner, the communication intervals of communication may be made longer and wireless communication may be performed with lower power consumption.

Figure 5:
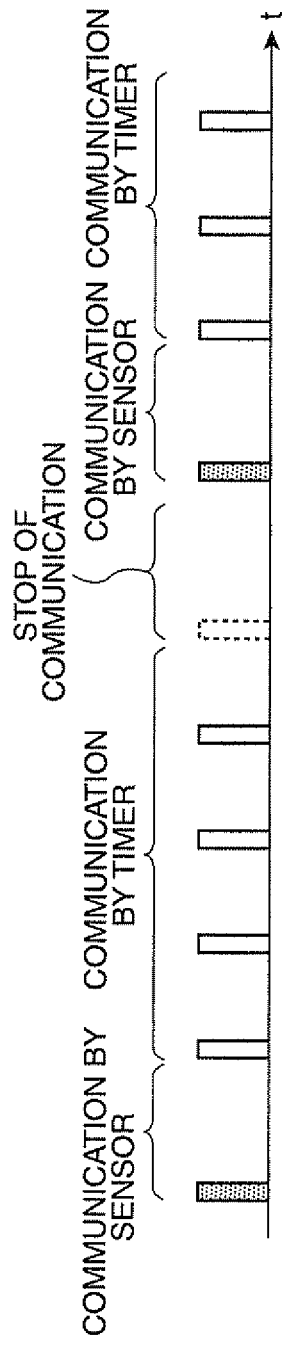
FIG. 5 is a diagram for explanation of the technique of the embodiment.

Further, in the communication system of the embodiment, communication may be performed based on the outputs of the sensor at the start of communication, and then, communication may be performed based on the outputs of the timer as shown in FIG. 5. If the communication based on the output of the timer is stopped due to synchronization shift, communication may be started again based on the output of the sensor and transferred to communication based on the output of the timer after a predetermined time has elapsed. In this manner, by starting the communication based on the output of the sensor, the power consumption at the start of communication when power consumption is larger may be reduced.

3. Processing

Next, examples of processing of the embodiment will be explained using flowcharts in FIGS. 6 and 7.

Figure 6:
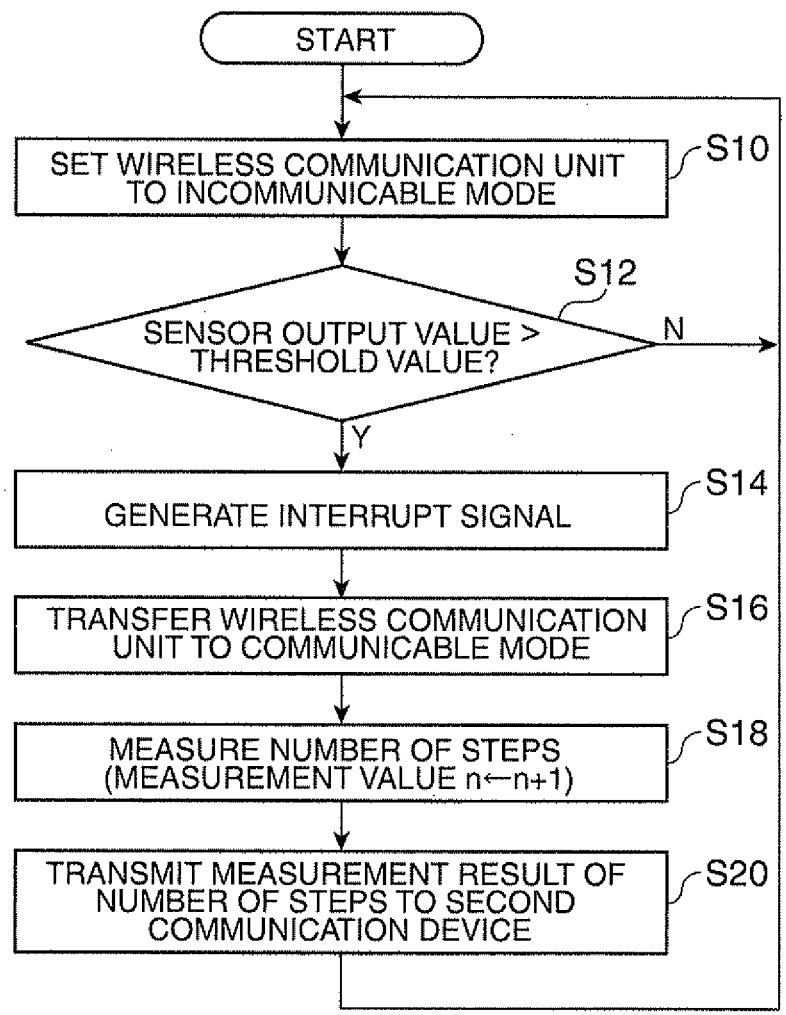
FIG. 6 is a flowchart showing an example of processing of a first communication device.

FIG. 6 is a flowchart showing an example of processing of the first communication device 10.

First, the communication control unit 104 sets the wireless communication unit 130 to the incommunicable mode (the mode in which no power is supplied to the wireless communication unit 130) (step S10). Then, the communication control unit 104 determines whether or not the output value of the first sensor 110 has exceeded a predetermined threshold value (step S12). If the unit determines that the output value of the first sensor 110 has not exceeded the predetermined threshold value (N of step S12), the process moves to processing at step S10.

If determining that the output value of the first sensor 110 has exceeded the threshold value (Y of step S12), the communication control unit 104 generates an interrupt signal (step S14) and transfers the wireless communication unit 130 to the communicable mode (the mode in which power is supplied to the wireless communication unit 130) (step S16).

Next, the sensor input unit 102 performs processing of measuring the number of steps (step S18). That is, the sensor input unit 102 increases the measurement value n (count value) of the number of steps by one. Then, the communication control unit 104 transmits the measurement value measured in the sensor input unit 102 to the second communication device 20 via the wireless communication unit 130 (step S20), and the process moves to processing at step S10.

Figure 7:
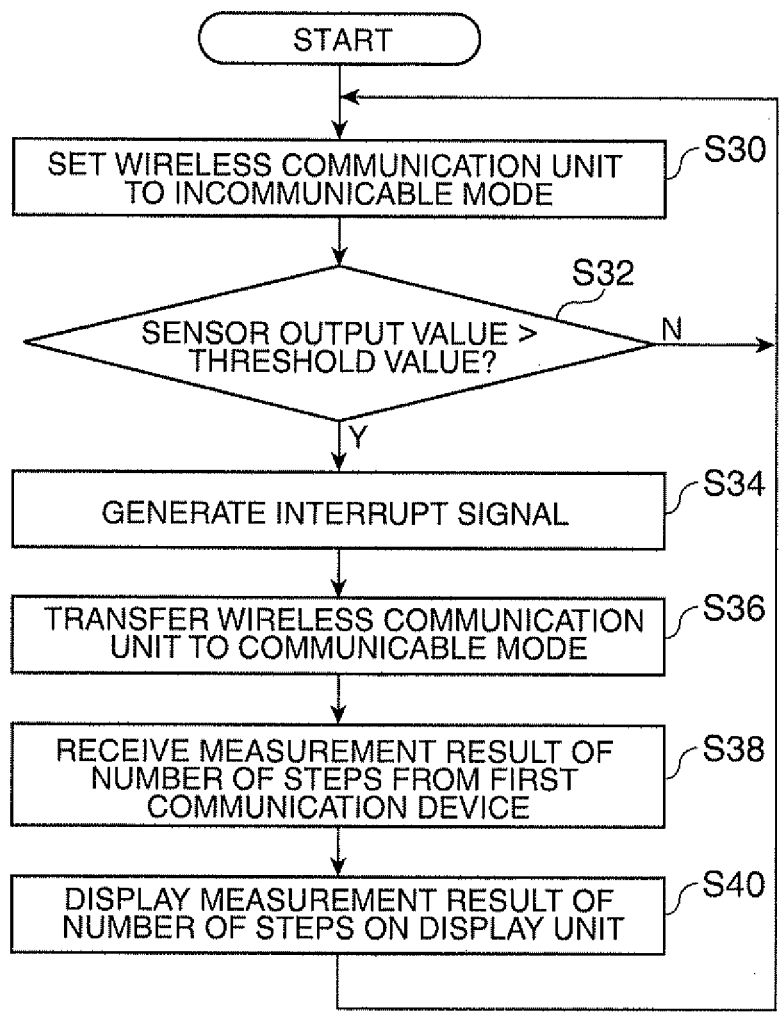
FIG. 7 is a flowchart showing an example of processing of a second communication device.

FIG. 7 is a flowchart showing an example of processing of the second communication device 20.

First, the communication control unit 204 sets the wireless communication unit 230 to the incommunicable mode (the mode in which no power is supplied to the wireless communication unit 230) (step S30). Then, the communication control unit 204 determines whether or not the output value of the second sensor 210 has exceeded a predetermined threshold value (step S32). If the unit determines that the output value of the second sensor 210 has not exceeded the predetermined threshold value (N of step S32), the process moves to processing at step S30.

If determining that the output value of the second sensor 210 has exceeded the threshold value (Y of step S32), the communication control unit 204 generates an interrupt signal (step S34) and transfers the wireless communication unit 230 into the communicable mode (the mode in which power is supplied to the wireless communication unit 230) (step S36).

Next, the communication control unit 204 receives the measurement value of the number of steps transmitted from the first communication device 10 via the wireless communication unit 230 (step S38). Then, the circuit arrangement 200 performs processing of allowing the display unit 230 to display the received measurement value of the number of steps (step S40), and the process moves to processing at step S30.

4. Modified Example

The technical range of the invention is not limited to the embodiment, but changes may appropriately made without departing from the scope of the invention.

For example, in the embodiment, the case where the user carries the first communication device and the second communication device (they are mounted on the body) has been explained, however, the first communication device and the second communication device may be mounted on a vehicle body. For example, the communication system according to the invention may be applied to a TPMS (tire pressure monitoring system). In this case, the first communication device measures the air pressure of the tire of the vehicle and transmits the measurement value to the second communication device provided inside of the vehicle via wireless communication, and the second communication device displays the received measurement value on a display provided within the vehicle. Further, the first communication device and the second communication device include inertia sensors (corresponding to the first and second sensors) that detect movement, and perform communication according to times when detecting movement of the vehicle (acceleration and deceleration of the vehicle).

Further, in the embodiment, the case where communication is performed while the communication times are determined based on the outputs of the inertial sensors that detect movement has been explained, however, communication may be performed while the communication times are determined based on outputs of sensors that detect, light, sound, or pressure. Or, detection results of another sensor than the sensor that determines the communication times may be communicated.

Figure 8A:
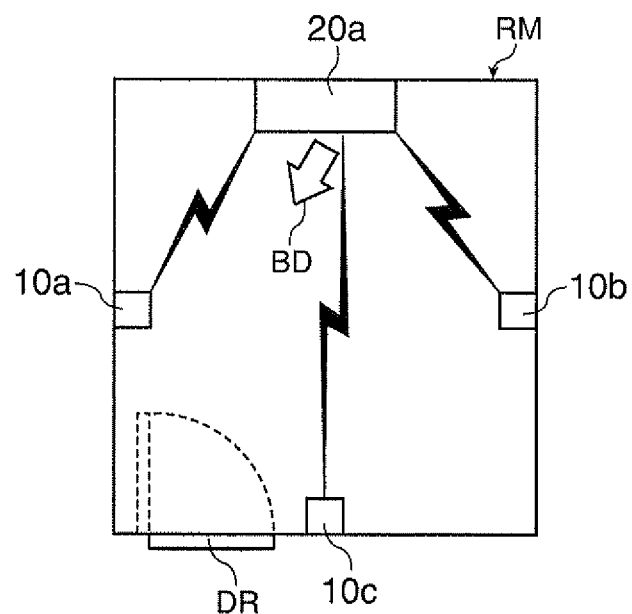
FIGS. 8A and 8B are diagrams for explanation of a modified example.
Figure 8B:
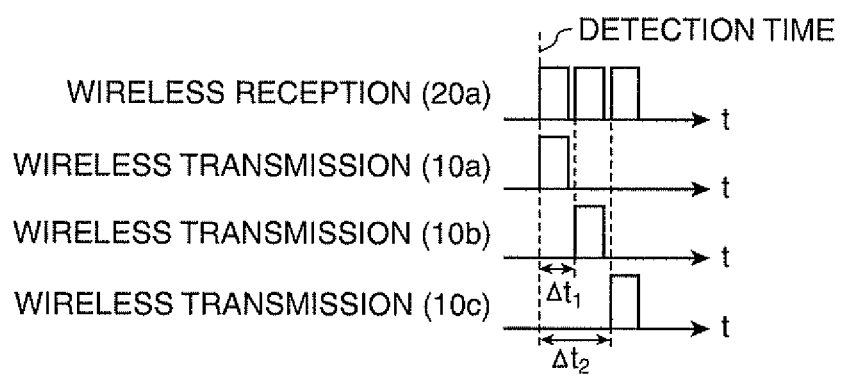

FIGS. 8A and 8B are diagrams for explanation of examples of a communication system of performing communication based on outputs of sensors that detect other events than movement.

A communication system shown in FIG. 8A includes a communication device 20a functioning as an air conditioner (corresponding to the second communication device), and three communication devices 10a, 10b, 10c performing wireless communication with the communication device 20a (corresponding to the first communication device). The respective communication devices 20a, 10a, 10b, 10c are provided on the respective side walls of a room RM, respectively include sensors that detect light (corresponding to the first and second sensors), and determine communication times based on the outputs of the sensors and perform communication. Further, the three communication devices 10a, 10b, 10c respectively include temperature sensors that detect the temperatures inside of the room, and transmit detection results of the temperature sensors to the communication device 20a.

When a user enters the room RM and turns on lighting equipment of the room RM, the three communication devices 10a, 10b, 10c respectively transmit measurement values of the temperatures based on the outputs of the temperature sensors to the communication device 20a at the times when detecting the light from the lighting equipment. Similarly, the communication device 20a receives the measurement values of the temperatures transmitted from the respective communication devices 10a, 10b, 10c at the times when detecting the light from the lighting equipment. The communication device 20a functioning as the air conditioner controls a blowing direction BD of the air based on the measurement values of the temperatures received from the respective communication devices 10a, 10b, 10c. In this manner, by providing plural communication devices including sensors that detect light in the same room, the lighting of the lighting equipment provided in the room may be detected nearly at the same time and communication may be performed according to the times when the lighting of the lighting equipment is detected.

Note that, in the example of FIG. 8A, in place of the sensors that detect light, sensors that detect sound or sensors that detect pressure may be used. In the case where the sensors that detect sound are used, for example, the sound when the user opens a door DR of the room may be detected nearly at the same time and communication may be performed according to the times when the sound is detected. Further, in the case where the sensors that detect pressure are used, the minor change of the air pressure within the room when the user opens (or closes) the door DR of the room may be detected nearly at the same time and communication may be performed according to the times when the change of the air pressure is detected.

Further, in the case where data is transmitted from plural communication devices to one communication device by communication like the example of FIG. 8A, the times of transmission and reception of the data may be shifted with respect to each communication device. In the example of FIG. 8B, the communication device 10a transmits the measurement value to the communication device 20a nearly at the same time with the time when detecting light (or sound, pressure), the communication device 10b transmits the measurement value to the communication device 20a after a time $\Delta t_1$ has elapsed from the time when detecting light, and the communication device 10c transmits the measurement value to the communication device 20a after a time $\Delta t_2$ has elapsed from the time when detecting light. In this manner, when data is transmitted from plural communication devices to one communication device, occurrence of collision may be prevented.

What is claimed is:

1. A circuit arrangement that performs communication with an external device including a second sensor detecting a given event, comprising:
a sensor input unit that processes input from a first sensor detecting the given event; and
a communication control unit that controls operation of a wireless communication unit, wherein
the communication control unit (i) generates an interrupt signal to bring the wireless communication unit into a communicable status only if it is determined that the output value of the first sensor has exceeded a predetermined threshold value, and (ii) determines a communication time based on an output of the first sensor;
the communication control unit causing the wireless communication unit to communicate a measurement result of the given event detected by the sensor input unit with the external device only during the determined communication time.

2. The circuit arrangement according to claim 1, wherein communication with the external device via the wireless communication unit is started based on the output of the first sensor, and communication with the external device via the wireless communication unit is performed based on an output of a timer after a predetermined time has elapsed from the start of the communication.

3. The circuit arrangement according to claim 1, wherein communication with the external device via the wireless communication unit is performed when it is determined that the output of the first sensor satisfies a predetermined condition a predetermined number of times.

4. The circuit arrangement according to claim 1, wherein communication with the external device via the wireless communication unit is performed after a predetermined time has elapsed from a determination that the output of the first sensor satisfies a predetermined condition.

5. The circuit arrangement according to claim 1, wherein the first sensor is a sensor that detects at least one of movement, light, sound, and pressure.

6. A communication device comprising:
the circuit arrangement according to claim 1;
the first sensor; and
the wireless communication unit.

7. The communication device according to claim 6, wherein the first sensor is an inertia sensor that detects movement, and
the circuit arrangement performs processing of measuring the number of steps based on the output of the first sensor, and performs processing of transmitting a measurement result to the external device via the wireless communication unit at a communication time determined based on the output of the first sensor.

8. A communication system including a first communication device and a second communication device that perform wireless communication with each other,
the first communication device including:
a first wireless communication unit that performs wireless communication between the second communication device and itself,
a first sensor that detects a given event, and
a first circuit arrangement that determines a first communication time based on an output of the first sensor, and communicates a measurement result of the given event detected by the first sensor with the second communication device via the first wireless communication unit only during the first communication time, and
the second communication device including:
a second wireless communication unit that performs wireless communication between the first communication device and itself,
a second sensor that detects the given event, and
a second circuit arrangement that determines a second communication time based on an output of the second sensor, and performs communication with the first communication device via the second wireless communication unit according to the second communication time,
wherein the first communication device generates an interrupt signal to bring the first wireless communication unit into a communicable status only if it is determined that the output value of the first sensor has exceeded a predetermined threshold value.

9. The communication system according to claim 8, wherein the first sensor and the second sensor are inertia sensors that detect movement, and
the first communication device and the second communication device are mounted on a human body or a vehicle body.

10. The communication system according to claim 8, wherein the first sensor and the second sensor are inertia sensors that detect movement,
the first circuit arrangement performs processing of measuring the number of steps based on the output of the first sensor, and performs processing of transmitting a measurement result to the second communication device via the first wireless communication unit at a communication time determined based on the output of the first sensor, and
the second circuit arrangement performs processing of receiving the measurement result via the second wireless communication unit at a communication time determined based on the output of the second sensor.

* * * * *